Jan. 10, 1967  C. D. MURDOCH  3,297,361
AUTOMOBILE SAFETY DEVICE
Filed Sept. 20, 1965  2 Sheets-Sheet 1
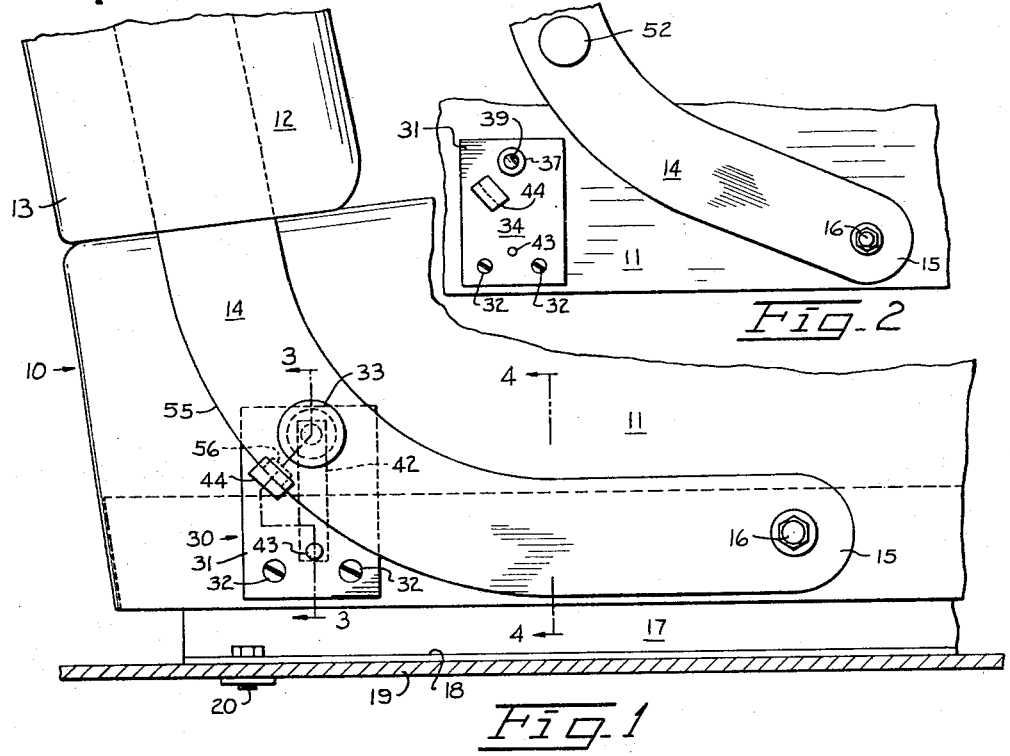
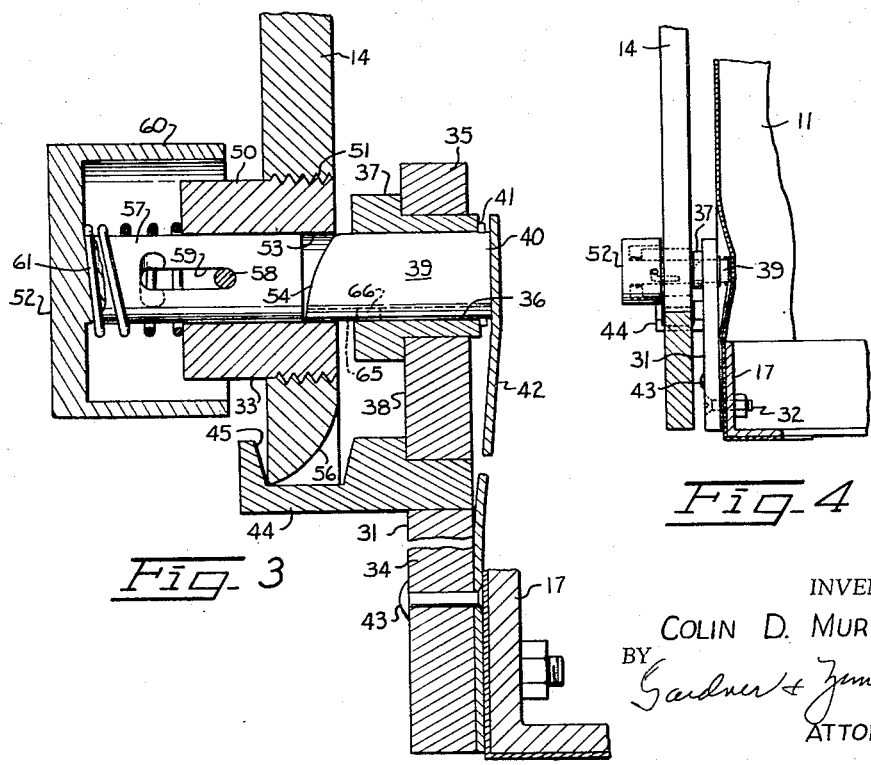
INVENTOR.
COLIN D. MURDOCH
BY Gardner & Zimmerman
ATTORNEYS

INVENTOR.
COLIN D. MURDOCH

United States Patent Office 3,297,361
Patented Jan. 10, 1967

3,297,361
AUTOMOBILE SAFETY DEVICE
Colin D. Murdoch, Walnut Creek, Calif., assignor to Susan May, San Lorenzo, Calif.
Filed Sept. 20, 1965, Ser. No. 488,499
8 Claims. (Cl. 297—379)

This invention relates to safety devices for automobiles, and more particularly, to a safety device for automobiles having seats with tiltable backrests.

A large number of automobiles have front seats which have backrests that are capable of being tilted forward toward the dash board to afford access to either rear seats or compartments located behind the seats. Typical in the construction of these types of seats, whether they are the bucket-type or the more conventional single seat cushion with split backrest, is to carry each backrest on two pivots, one on each side of the backrest and pivoting it on the supporting structure of the horizontal seat cushion. Normally these pivots are located so that the greater part by weight of the backrest is located off (behind) the pivot axis which causes the backrest to be held upright by its own weight because of the moment created in such a design.

Of course, when the backrests are tilted sufficiently toward the dash that the greater part by weight of the backrest is located on the opposite (front) side of the pivot axis, the backrest will remain in the jack-knifed position.

Both the simplicity and highly satisfactory operation of this type of design has led to its wide acceptance in the automotive industry where either passenger or other access is desired to areas located behind the front seat of the vehicle. However, while designs of this type are functionally acceptable, they leave something to be desired from the standpoint of the safety of the occupants of the vehicle. This results from the fact that the backrests are free to tilt forward at all times and will do so because of their own inertia and/or that of objects located in the rear portion of the vehicle when rapid deceleration occurs, such as would be involved in a quick stop or a head-on collision. For example, mothers often put small children in the rear seat of automobiles to protect them and they often are forcefully propelled against the backrests of the front seat when a sudden stop occurs. Their weight, plus that of the backrest, will cause the backrest to move forward pushing the occupant using the backrest sharply forward into the dash or steering wheel with possible injury. If the seat on the non-driver's side is not occupied a child may be catapulted over this backrest as it tilts forward and into the dash or windshield with possible serious injury.

In addition, since the backrest is free to tilt forward, shoulder straps, one of the most effective safety devices for preventing injury to the occupant of a vehicle involved in a sudden stop, cannot be attached to the backrest which is one of the reasons that shoulder straps, which have proved so effective in protecting pilots in aircraft, have received so little acceptance in automobiles having tiltable backrests.

A solution to improving the safety of the occupants riding in automobiles having tiltable backrests is to provide the backrests with releasable locking devices which will lock them in the upright position so they would not whip forward during rapid deceleration and will render the backrest suitable as a support for shoulder straps. While many locking devices for backrests have been proposed heretofore, they have been generally unsatisfactory in themselves or are unsatisfactory for the purposes of this invention, because of such factors as costly construction, complicated installation, etc.

Accordingly it is an object of this invention to provide a rugged, strong latching means for securing the backrests of automobiles having tiltable backrests and preventing their forward tilting movement during periods of rapid deceleration of the vehicle.

Another object is to provide a latching means for tiltable backrests of automobiles which will render the backrest structurally resistant to tilting movements and capable of supporting shoulder straps during periods of rapid deceleration of the vehicle.

Also, it is an object to provide a universal latching means for tiltable backrests of automobiles which is substantially jam proof and easily adapted to automobiles not equipped with such latching devices.

The above objects and advantages can be accomplished by a latching assembly, in combination with a conventional automobile seat having a mounting support member, a generally horizontal seat cushion and a tiltable backrest hinged on the support member, comprising of an anchor plate secured to the mounting support member so as to have a portion of the backrest structure remote from the hinge point in a close overlapping relationship, a latching pin reciprocally movable substantially parallel with the hinge axis of the tiltable backrest and located in a bore in the anchor plate in the area of overlapping relationship, a spring engaging the inboard end of the latching pin to urge it outward through the bore, a bushing secured in part of the overlapping structure of the backrest adjacent to the anchor plate and having a bore axially aligned with the bore in the anchor plate when the backrest is in the upright position whereby the latching pin enters the bore of the bushing under the influence of the spring so as to be simultaneously in both the bore in the bushing and the bore of the anchor plate to interlock the backrest to the support member through the anchor plate and a depressible plunger located in the bushing to force the latching pin out of the bore of the bushing when the backrest is to be released. Also, the above combination in combination with a shoulder strap integrated with the backrest and seat belts.

The above objects and other objects apparent from the description of the invention will become better understood by reference to and description of the accompanying drawings wherein:

FIGURE 1 is an elevation of one side of a conventional seat structure having a tiltable backrest with the latching device of this invention installed thereon with non-relevant parts of the seat structure broken away;

FIGURE 2 is an elevation similar to FIGURE 1 wherein the backrest has been released and has been tilted forward exposing the anchor plate of the latching assembly;

FIGURE 3 is a stepped section taken along line 3—3 of FIGURE 1 showing internal detail of the latching assembly and its attachments to a conventional seat structure;

Figure 5:
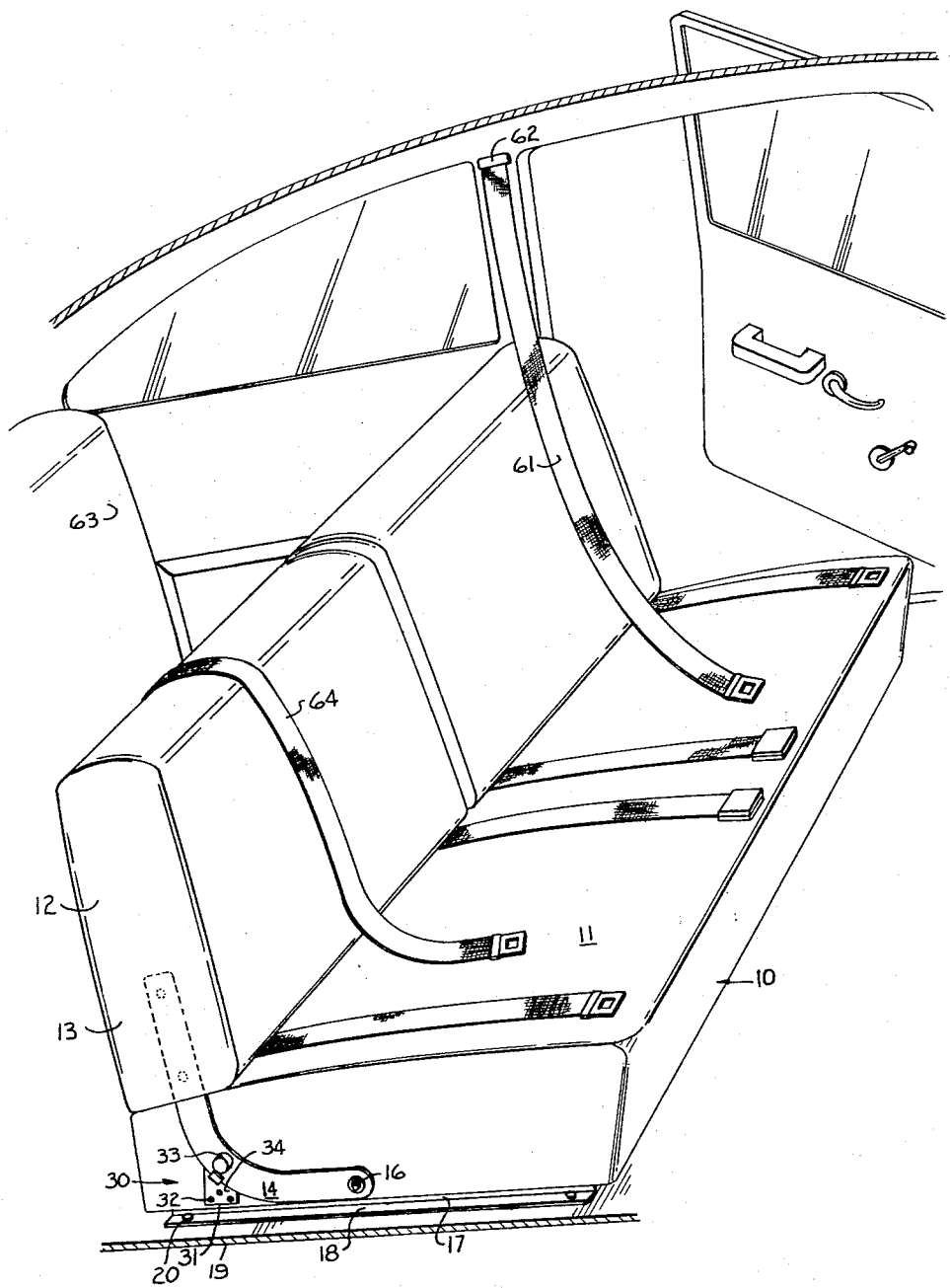

FIGURE 4 is a vertical section taken along line 4—4 of FIGURE 1 showing the latching assembly in a released position; and FIGURE 5 is a perspective of the inside of an automobile having a front seat with tiltable backrests and having parts broken away showing the conventional mounting of a shoulder strap in a sedan on the driver's side and the combination of a shoulder-strap and latching assembly made possible by this invention on the other side.

This invention can be better understood by referring to FIGURE 1 and showing a conventional automobile seat 10 having seat cushion 11 and a tiltable backrest 12. As is typical in most installations of this type, the backrest 12 is supported on its outboard side 13 by a curved hinge arm 14 which depends from the bottom of the backrest and is pivoted at its free end 15 by a pivot pin 16. Pivot pin 16 is shown in the drawings as a bolt which is secured in the upper portion of the seat's structural support member 17 which has its flange 18 secured to the automobile's floor 19 by bolts 20. The inboard side of the backrest 12 is usually carried on a stud pin (not shown) projecting from that side and passing through support to form the pivot (not shown) for the inboard side of the backrest.

The mounting of the latching assembly of this invention on the conventional design of automobile seats with tiltable backrests can be seen in FIGURES 1 and 5. Specifically the latching assembly 30 consists of two principal parts, an anchor plate 31 which is secured to the seat structural support member 17 by flush head bolts 32 and a cooperating bushing and release 33 mounted in the curved hinge arm 14.

Anchor plate 31 is detailed in FIGURE 3 and is generally mounted to the seat support member 17 aft of pivot pin 16 so that the upper portion of the plate is overlapped by a portion of the curved hinge arm 14 when the backrest 12 is in the upright position. More specifically, as shown in FIGURE 3, the anchor plate is shown generally as a rectangular plate 34 which is at least as structurally strong as arm 14. The upper portion 35 of plate 34 has a bore 36 in which is secured a support bushing 37 having a collar 37' in abutment with the outboard face 38 of the plate.

A latching pin 39 adapted to slide back and forth in bushing 37 is mounted therein so that a portion thereof extends beyond both sides of plate 34 and bushing 37. The inboard end 40 of the latching pin has a pin keeper 41 which limits to outboard travel of pin 39, and a leaf spring 42 bears against this end to urge the pin in the outboard direction until keeper 41 stops the pin. Leaf spring 42 is secured to the lower part of plate 34 with a rivet 43.

Projecting from the outboard face 38 of plate 34 is a backrest stop 44 which is shown as a metal clip member secured to the plate by bolts. The clip member has a flared groove 45 aligned with arm 14 and in which the arm rests when the backrest is in its normal upright position. Besides providing a stop to align the bores of the latching mechanism, the clip member prevents lateral movement of the arm 14 with respect to the anchor plate so that the latch cannot be released inadvertently by lateral forces.

The other portion of the latching assembly is the bushing and release structure 33 as mentioned above as one of the two main components. Of course, this structure is mounted on and becomes part of the curved hinge arm 14 when the device has been installed in the seat of an automobile. Basically this structure consists of a threaded bushing 50 which is screwed into a tap 51 provided for that purpose in arm 14, and a spring loaded cap 52. The tap, passing completely through the arm 14 for the bushing, is located in the arm so that the bore 53 of the bushing will be in registry with bore 36 of anchor plate 31 when arm 14 is resting on stop 44.

Since latching pin 39 located in bushing 37 has its outboard end 54 projecting out sufficiently to overlap arm 14 and is urged outboard by leaf spring 42, pin 39 will move into bore 53 under the influence of the leaf spring when bores, 36 and 53, respectively, are in registry, latching the backrest 12. Because of the overlapping relationship of arm 14 and latching pin 39 the outboard end 54 of the pin is chamfered so that the edge 55 of the arm 14 engaging it will force it inboard against the pressure of leaf spring 42 to allow the arm to pass by the pin in order to prevent rotation of the pin within bushing 37, the pin has a slot 65 in which rides a key 66 secured to the bushing. This edge 55 may also have a chamfer 56 to help arm 14 pass by pin 39.

After the backrest 12 of the seat 10 has been locked in the upright position some means must be provided to release or displace latching pin 39 from the bore 53 of the bushing 50 so the backrest can be tilted forward when desired. This is accomplished in the instant invention by a plunger 57 located in the outboard portion of bore 53 of bushing 50. The plunger is slotted in its central portion and is retained in the bore by a keeper pin 58 passing through the bushing and through the slot 59 in the plunger. Slot 59 is axially aligned with the plunger's axis so that the plunger may reciprocate in the bore after the keeper has been inserted to retain it.

For convenience the outboard end of the plunger 57 is equipped with a large cap to make depressing the plunger easier and also limit its inboard travel sufficiently to prevent it from entering the bore 36 in the anchor plate 31. In the embodiment shown in the drawings the cap 52 has a skirt 60 which slides over bushing 50 when the plunger is depressed and limits the plunger's travel when the base of the skirt hits arm 14. Also a compressible return spring 61 is provided between the bushing and the inboard surface of the cap 52 to return it after it has been depressed, however, this would not be necessary since leaf spring 42 will force the plunger back when latching pin 39 enters bore 53 of the bushing during the latching operation.

Referring to FIGURE 5, it can be seen that the shoulder strap 61 conventionally attached to the support 62 above and behind the backrest 12 on the driver's side is cumbersome and in the way of a person wanting access to the rear seat 63 while the attachment of shoulder strap 64 to or over the backrest 12 on the other side made possible by this invention does not present such an inconvenience to passengers desiring access to the rear seat.

Naturally, when the shoulder strap 64 is attached to backrest 12 and combined with the latching assembly 30, the strength of the backrest structure determines the effectiveness of the combination. However, it should be appreciated that the latching assembly of this invention uses a metal latching pin or bolt that is subjected primarily to shear during rapid deceleration and would normally be the last structural element to fail.

Also, it can be seen that the latching assembly is nearly jam proof and that should the backrest be desired to be released after an accident a sharp kick on cap 52 will almost always release the backrest and allow quick and convenient access to the rear seat for rescue. Other more complicated latching assemblies would be much more likely to jam under such circumstances.

What is claimed is:

1. In a vehicle seat assembly having a mounting member to which is pivotally hinged a backrest that is tiltable between a folded forward position and a normal upright position at which a portion of the backrest structure away from the hinge point closely overlaps a portion of said mounting member, a releasable latching assembly comprising a latching pin secured in the area of said overlap to said mounting member for reciprocal movement substantially parallel with the hinge axis of said backrest, said backrest structure defining a bore in the area of said overlap which is in alignment with said pin when said backrest is in the upright position, spring means for resiliently urging said pin into engagement with said bore to interlock said backrest to said mounting member when said backrest is in said upright position and prevent its tiltable movement to said folded forward position, and a plunger member extendable into the bore of said backrest structure to force said latching pin therefrom against the pressure of said spring means to selectively release said backrest structure for tilting movement into the folded forward position.

2. The releasable latching assembly of claim 1 further including a backrest stop means projecting from said mounting member to engage the backrest structure and prevent further tiltable movement thereof in the upright direction when said latching pin is in alignment with said bore.

3. The releasable latching assembly of claim 1 wherein the end of said pin engageable with said bore is chamfered at the portion thereof engaged by said backrest structure as said structure moves to its upright position so that said structure moves said pin against the pressure of said spring means to permit said structure to reach its upright position whereat said pin engages said bore.

4. In the vehicle seat assembly of claim 1, the combination with said releasable latching assembly of a shoulder strap secured to said backrest structure for passing over the shoulder of a passenger within said vehicle to maintain said passenger therewithin.

5. The releasable latching assembly of claim 1 wherein said pin is secured to said mounting member by means of an anchor plate having a bore through which said pin extends for said reciprocal movement.

6. The releasable latching assembly of claim 5 wherein said spring means comprises a leaf spring secured to said anchor plate and bearing against the end of said pin distal from the bore in said backrest structure, and a backrest stop projects from said anchor plate to engage the backrest structure and prevent further tiltable movement in the direction of the upright position when said latching pin is in alignment with the bore is said structure.

7. The releasable latching assembly of claim 5 wherein the bore within the backrest structure is defined by a bushing, and said plunger member includes an actuation cap and is resiliently urged outward from said bore by means of a compressible spring.

8. The releasable latching assembly of claim 5 wherein said spring means comprises a leaf spring secured to said anchor plate and bearing against the end of said pin distal from the bore in said backrest structure, a backrest stop projects from said anchor plate to engage the backrest structure and prevent further tiltable movement in the direction of the upright position when said latching pin is in alignment with the bore in said structure, the bore within the backrest structure is defined by bushing, said plunger member includes an actuation cap and is resiliently urged outward from said bore by means of a compressible spring, and a shoulder strap is secured to said backrest structure for passing over the shoulder of a passenger within the vehicle to maintain said passenger therewithin.

References Cited by the Examiner

UNITED STATES PATENTS

| 2,833,336 | 5/1958 | McGregor | 297—379 X |
| 2,959,206 | 11/1960 | Tedesco | 297—367 |
| 3,008,765 | 11/1961 | Tischler et al. | 297—367 |
| 3,015,520 | 1/1962 | Johnson | 297—371 |
| 3,079,199 | 2/1963 | Tischler | 297—367 |
| 3,189,383 | 6/1965 | Griech | 297—365 |

FRANK B. SHERRY, *Primary Examiner.*

G. O. FINCH, *Assistant Examiner.*